UNITED STATES PATENT OFFICE.

ALBERT COBENZL, OF HÖCHST-ON-THE-MAIN, GERMANY, ASSIGNOR TO THE FARBWERKE, VORMALS MEISTER, LUCIUS & BRÜNING, OF SAME PLACE.

GRAY DYE.

SPECIFICATION forming part of Letters Patent No. 588,397, dated August 17, 1897.

Application filed May 6, 1897. Serial No. 635,422. (Specimens.)

*To all whom it may concern:*

Be it known that I, ALBERT COBENZL, chemist, a citizen of the Empire of Austria-Hungary, residing at Höchst-on-the-Main, Germany, have invented certain new and useful Improvements in the Manufacture of New Safranin Derivatives, of which the following is a specification.

This invention relates to the manufacture of a gray dyestuff, being a new safranin derivative obtained by the condensation of alkylsafranin with formaldehyde.

I have found that when formaldehyde is condensed with alkylsafranins in a strong mineral-acid solution the resulting safranin derivatives form valuable gray dyestuffs which are characterized by their great fastness to soap and alkali.

My new process is carried out as follows:

Example I. One hundred parts, by weight, of dimethylsafranin, two hundred parts, by weight, of concentrated hydrochloric acid, and one hundred parts, by weight, of formaldehyde (containing forty per cent.) are heated on the water-bath until the disappearance of the safranin reaction. The greenish-black solution is then largely diluted with boiling water. The dyestuff is then precipitated from the filtered bluish-gray solution by chlorid of zinc.

Example II. One hundred parts of diethylsafranin, two hundred parts of concentrated hydrochloric acid, and one hundred parts of formaldehyde, all taken by weight, are treated in the same manner as in Example I and the dyestuff precipitated, as described.

Both dyestuffs are obtained according to the above examples as a black powder. They are soluble in concentrated sulfuric acid with a green color, which turns to blue on addition of water. They are insoluble in ether, benzene, ligroin, &c., difficultly soluble in alcohol, but easily soluble in water. From the aqueous solution the product of Example I is readily and entirely precipitated in the form of red flakes by acetate of sodium, ammonia, and alkali. Mineral acids precipitate the dyestuff from the bluish-gray solution. The product of Example II is not precipitated from the aqueous solution by acetate of sodium, but by ammonia and alkali, also by the addition of mineral acids.

The new dyestuff dyes tanned cotton and silk in a gray color which is absolutely fast to water.

Having thus described my invention, I claim as new and desire to secure by Letters Patent—

1. The process herein described of producing a gray dyestuff, which consists in condensing alkylsafranin with formaldehyde in a strong mineral-acid solution; substantially as set forth.

2. As a new product the gray dyestuff, being a safranin derivative obtained by the condensation of alkylsafranin with formaldehyde in a strong mineral-acid solution, and being a black powder, easily soluble in water, difficultly soluble in alcohol, insoluble in ether, benzene, ligroin, &c., and soluble in concentrated sulfuric acid with a green color, substantially as set forth.

In testimony that I claim the foregoing as my invention I have signed my name in presence of two subscribing witnesses.

ALBERT COBENZL.

Witnesses:
HEINRICH HAHN,
ALFRED BRISBOIS.